United States Patent Office 3,518,325
Patented June 30, 1970

3,518,325
POLYSILOXANE RELEASE COATINGS
James K. Campbell, Midland, and Lawrence C. Sprenger, North Bradley, Mich., assignors to Dow Corning Corporation, Midland, Mich., a corporation of Michigan
No Drawing. Continuation-in-part of application Ser. No. 676,636, Oct. 19, 1967, which is a continuation-in-part of application Ser. No. 648,937, June 26, 1967. This application Apr. 1, 1969, Ser. No. 812,450
Int. Cl. C08g 47/00
U.S. Cl. 260—825      6 Claims

ABSTRACT OF THE DISCLOSURE

Polydimethylsiloxane coatings for fibrous substrates possessing rapid curing and excellent release properties are made from a mixture of polydimethylsiloxane, methyl hydrogen polysiloxane, silicate ester of the formula $Si\{(OC_2H_4)_nOR_1\}_4$, a curing catalyst and optionally an isocyanate.

---

This application is a continuation-in-part of applicants' application Ser. No. 676,636, filed Oct. 19, 1967, now abandoned, which in turn is a continuation-in-part of their application Ser. No. 648,937, filed June 26, 1967, now abandoned.

Polydimethylsiloxanes have achieved outstanding success as release coatings for substrates such as paper, paperboard, textile fabrics and metal foils, as is particularly set forth in the patent of Joseph W. Keil, No. 3,061,567. However, paper mills and other fabric manufacturing establishments are running their machines at higher and higher speeds so that a great need has arisen for a polydimethylsiloxane composition which will cure in a matter of seconds at temperatures under 70° C. to give release coatings of equivalent quality of those in the aforesaid Keil patent.

It is known from U.S. Pat. 2,902,467, that silicates of the formula $Si(OC_2H_4OR_1)_4$ can be used as crosslinking agents for room-temperature vulcanizing silicone rubber and that these silicates cause curing at a rate faster than silicates of the structure $Si(OR_1)_4$. However, fast cure alone is not sufficient for a satisfactory release coating.

In addition the cured coating must have the other necessary properties which are
(1) absence of transfer of the siloxane to the untreated side of the substrate or to the adhesive mass in contact with the coated surface (often called migration), and
(2) lack of rub-off.
The latter is a combination of two effects, namely;
(a) adequate film strength to stand the abrasion encountered during transportation and storage of the coated substrate and during fabrication of containers or garments therefrom, and
(b) adequate adhesion to the substrate to prevent removal under abrasive conditions.

The employment of the aforesaid silicates alone is not sufficient for the purpose of this invention. However, it has been found that a combination of the crosslinkers (2) and (3) shown below is sufficient to give fast cure at low temperatures and acceptable rub-off. When isocyanates are also used the rub-off is further enhanced.

This invention relates to a composition of matter consisting essentially of
(1) a dimethylpolysiloxane having silicon-bonded hydroxyls on the ends of the molecule and a viscosity of at least 2000 cs. at 25° C.,
(2) from 1 to 10% based on the weight of (1) of methyl hydrogen polysiloxane having an average of at least 3 SiH groups per molecule,
(3) a compound of the formula selected from the group consisting of $Si\{(OC_2H_4)_2OR\}_4$ and $Si\{OC_2H_4OR'\}_4$, in which R is an aliphatic hydrocarbon radical of from 1 to 4 inclusive carbon atoms and R' is an aliphatic hydrocarbon radical of from 3 to 6 inclusive carbon atoms,
(3) being employed in such amount that there is from .05 to 2% by weight Si based on the weight of (1),
(4) a curing catalyst for the composition, and
(5) an organic solvent soluble isocyanate having an average of at least two isocyanate groups per molecule and a molecular weight of at least 173 in amount from 0 to 5% by weight based on the weight of (1).

Each of the required ingredients in the above formulation is critical, both with respect to the nature of the ingredient and the proportion thereof. Ingredient (1) can be any hydroxyl endblocked dimethylpolysiloxane having a viscosity of at least 2000 cs. The upper limit of the viscosity is not critcal so that (1) can vary from fluids to non-flowing gums, that is the viscosity can be 10,000,000 cs. or above.

Ingredient (2) is a methyl hydrogen polysiloxane. This ingredient can have a linear, cyclic or branched configuration and can be either a homopolymer or a copolymer. In any event the percent by weight of

should be from 1 to 10% preferably from 1 to 5%, based on the weight of (1).

Examples of such compositions are:

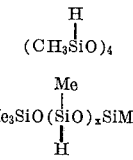

in which $x$ has values of 3, 5, 25 and 50;

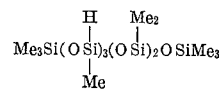

and

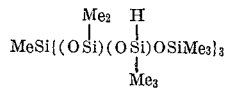

Since (2) serves as one of the crosslinkers it is necessary that there be on the average at least 3 SiH groups per molecule.

The second type of crosslinkers employed in this invention are certain silicates derived from ethylene glycol. They are silicates of the formula $Si\{(OC_2H_4)_2OR\}_4$ in which R can be, for example, methyl, ethyl, isopropyl, butyl, vinyl or allyl and of the formula $Si\{OC_2H_4OR'\}_4$ in which R' can be, for example, propyl, allyl, butyl, pentyl, pentenyl or hexyl. It has been found that silicates of the above type which are outside of the scope of this invention are either too active for satisfactory cure or the cure rate is too slow.

The amount of (3) employed is also critical and should be in an amount of from .1 to 2% by weight Si (added as the silicate) based on the weight of (1).

Optional ingredient (5) can be any organic isocyanate which is soluble in organic solvents and which has an average of at least two isocyanate groups per molecule and a molecular weight of at least 173. For the purpose of this invention any isocyanate meeting the above qualification is operative. Thus, the isocyanate can be monomeric or polymeric in nature. For example, the isocyanate can be a partially hydrolyzed toluene diisocyanate. In other words, an urea or polyurea which still retains isocyanate groups in the molecule or a polybiuret containing unreacted isocyanate groups. The isocyanate can also be a reaction product of an isocyanate with a polyhydroxyl compound (i.e. a polyurethane or allophanates derived therefrom), the reaction product of an isocyanate and a polyamine which reaction products contain unreacted isocyanate groups. In addition the isocyanate can be a polymeric material in which the polymerization is effected by mechanisms not involving the isocyanate group, for example,

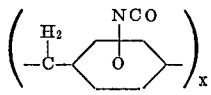

or

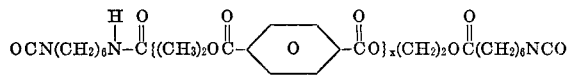

Specific examples of operative isocyanates are as follows:

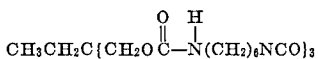

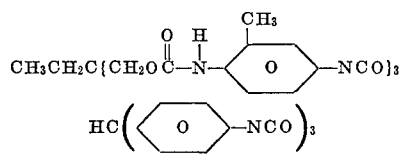

naphthalene diisocyanate-1,5;
3,3'-bitolylene-4,4'-diisocyanate

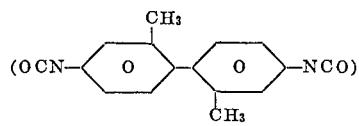

diphenylmethane-4,4'-diisocyanate;

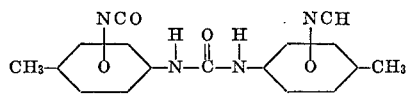

3,3'-dimethoxy-4,4'-diphenylenediisocyanate;
3,3'-diphenyl-4,4'-biphenylenediisocyanate

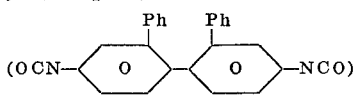

4,4'-biphenylene diisocyanate; 3,3'-dichloro-4,4'-biphenylene diisocyanate; 2-nitrodiphenylene-4,4'-diisocyanate; diphenylsulfone - 4,4' - diisocyanate; fluorine diisocyanate; octamethylenediisocyanate;

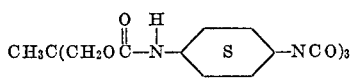

and

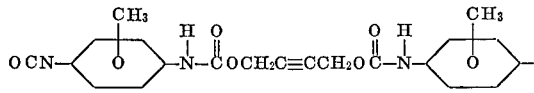

When employed, the isocyanate is used in amount of from .5 to 5% by weight based on the weight of (1). Proportions above this range have a deleterious effect on the coating composition.

Any curing catalyst suitable for curing hydroxyl siloxanes by way of interaction with SiH compounds and silicates can be employed herein. Suitable curing catalysts are, for example, amines, amine salts of carboxylic acids, quaternary ammonium compounds, and metal salts of carboxylic acids such as lead octoate, cobalt octoate, iron naphthenate and tin oleate. The preferred catalysts are the carboxylic acid salts of organo tin compounds containing at least one carbon tin bond such as butyl tin triacetate, ethyl tin trihexoate, dibutyl tin dilaurate, dibutyl tin succinate, octadecyl tin dilaurate and dihexyl tin di-2-ethylhexoate; and mercapto salts of the formula $Y_2Sn(SCH_2OOY')_2$ in which Y and Y' are radicals such as methyl, ethyl, octadecyl, butyl and isopropyl.

The amount of catalyst needed to effect proper cure varies with the type of catalyst, the precise crosslinker used and the particular temperature at which the coating is cured. Therefore, no meaningful numerical limitation can be used with respect to the catalyst except obviously each catalyst must be used in amount sufficient to cause the desired curing within the desired length of time.

The compositions of this invention can be applied to the substrate by any convenient method. If the composition is sufficiently fluid it can be applied per se. In general, however, it is desirable to dilute the composition with an inert solvent such as hydrocarbons or halogenated hydrocarbon solvents or ethers. The amount of solvent employed is not critical, but a convenient concentration is from 1 to 10% of the organosilicon composition based on the weight of the solution.

The composition can be applied to the substrate by knife coating, dipping or spraying. In those cases where the composition cures extremely rapidly it is desirable to apply the mixture through a mixing head where the time between the mixing of the ingredients and application to the substrate is reduced to a minimum. With other compositions, however, it is often desirable to pass the substrate through a bath of the coating composition.

The bath life of the compositions of this invention after mixing will vary, of course, with the temperature. If they are to be preserved for long periods of time they should be maintained at low temperature such as, for example, −20° to −25° C.; on the other hand, if they are to be employed immediately after mixing then the temperature is not critical. It has been found that the bath life of the composition after mixing can be prolonged by employing methylethylketone as the solvent or as a part of the solvent. Preferably, the methylethylketone is employed in amount of from 2 to 4 times the weight of (1). If desired, however, methylethylketone can be the sole solvent employed. When this is true the composition should be used within a few hours after mixing.

The compositions of this invention are useful on any substrate such as metal, ceramic, wood, paper, textiles such as cotton, wool, nylon, rayon, polyesters, vinylic fabrics, polyacrylonitrile fabrics and vinylchloride-vinylidenechloride copolymers. The composition can also be employed on inorganic textiles such as glass, cloth and asbestos.

In addition, to the desirable release properties of the compositions of this invention, they also impart water repellency, excellent hand and other desirable properties to the substrate.

The weight of coating applied to the substrate varies widely depending upon the use for which the coating is applied. For release coatings on paper the cured composition can range from .1 to 5% based on the weight of the paper. For other applications such as to render substrates water repellent or to protect surfaces the amount of cured coating can range up to 50% of the weight of the substrate.

Although the instant compositions are designed for fast cure at low temperature they can be cured on any temperature-time schedule below the decomposition point of the substrate and/or the coating. For example, the coating can be cured in less than one second at 200° C. oven temperature. For any given composition the higher the temperture the faster the cure.

The following examples are illustrative only and should not be construed as limiting the invention, which is properly delineated in the appended claims.

EXAMPLE 1

This example shows the effect of the elimination of ingredients (2), (3) and (5) from the compositions of this invention.

Effect of elimination of the methylhydrogenpolysiloxane (A) To 100 parts by weight of a 7% by weight xylene solution of a SiOH endblocked polydimethylsiloxane gum of about 10,000,000 cs. viscosity was added 5.4% based on the weight of the gum of $\{CH_3O(CH_2CH_2O)_2\}_4Si$, 2% by weight based on the weight of the gum of $$(-\langle O \rangle\overset{NCO}{|}-CH_2-)_n$$

in which $n$ has an average value of 6, and 6% by weight based on the weight of the gum of dibutyl tin di-2-ethylhexoate.

(B) This material had the same formulation as A above except 1.4% by weight based on the weight of the gum of $$Me_3Si\left(O\overset{H}{\underset{Me}{\overset{|}{Si}}}\right)_xSiMe_3$$

having a viscosity of 35 cs. at 25° C., was added.

Each of the above samples were applied to super calendered kraft paper and dried 60 seconds at 53° C. Each sample was tested at once for rub-off by abrading the coating in an identical manner. Sample A showed excessive rub-off and sample B showed none. Sample B also gave excellent release values when tested as shown below.

This experiment shows the effect of the elimination of the isocyanate (C) To 100 parts by weight of a 7% by weight xylene solution of an SiOH endblocked polydimethylsiloxane gum was added 4.5% by weight based on the weight of the gum of $\{CH_3O(CH_2CH_2O)_2\}_4Si$, 3% by weight based on the weight of the gum of $$Me_3Si(O\overset{H}{\underset{Me}{\overset{|}{Si}}})_{25}SiMe_3$$

and 6% by weight based on the weight of the gum of dibutyl tin di-2-ethylhexoate.

(D) Composition D was identical with C except that .5 part based on the weight of the gum of $$(-\langle O \rangle\overset{NCO}{|}-CH_2-)_n$$

where $n$ has an average value of 6, was added. Compositions C and D were each applied to super calendered kraft paper and air-dried 10 minutes at room temperature. Composition C showed excessive rub-off while composition D showed none. Composition D gave excellent release values when tested as shown below.

This series shows the effect of the elimination of the silicate (E) To 100 parts of a 7% xylene solution of a SiOH endblocked polydimethylsiloxane gum was added 3% by weight based on the weight of the gum of $$Me_3SiO\left(\overset{H}{\underset{Me}{\overset{|}{Si}O}}\right)_xSiMe_3$$

having a viscosity of 35 cs. at 25° C. and 6% by weight based on the weight of the gum of dibutyl tin-di-2-ethylhexoate.

(F) This composition was the same as E except that there was included $\{CH_3O(CH_2CH_2O)_2\}_4Si$ in amount so that there was .3% by weight Si based on the weight of the gum. Each sample was applied to super calendered kraft paper and each was cured for 60 seconds at 70° C. Sample E showed excessive migration of the siloxane as tested below, while sample F gave no migration of siloxane and excellent release as tested below.

In this series no isocyanate was employed because it has no effect on the rate of cure of the composition.

In all cases in this example the release value of the coating was tested as follows:

A polyvinylethylether adhesive was applied to the cured siloxane film and an uncoated paper was laminated to the top of the adhesive. The laminate was then pulled on an Instron machine at a rate of 50 inches per minute jaw separation. Samples B, D and F each gave a release of about 30 g. per inch of width of the paper.

The migration of the siloxane from the coating was tested by applying cellophane tape to the coated paper. The tape was then pulled from the surface of the coating and folded so that the adhesive surfaces of the tape came into contact with each other. The adhesive surfaces were then pulled apart manually and the force needed to do this was observed. In the case of sample E the adhesive surfaces separated easily indicating excessive migration and showing inadequate cure of the film while with sample F, the adhesive adhered tenaciously to itself indicating no migration.

EXAMPLE 2

Equivalent curing and release values are obtained when the following silicates are employed in Example 1B in amount of .3% by weight Si based on the weight of the gum.

$(C_4H_9OCH_2CH_2O)_4Si$, $\{C_2H_5O(CH_2CH_2O)_2\}_4Si$, $\{C_4H_9O(CH_2CH_2O)_2\}_4Si$ and $(C_6H_{13}OCH_2CH_2O)_4Si$

EXAMPLE 3

(A) 100 parts by weight of 7% xylene solution of the gum of Example 1A was mixed with 3% by weight based on the weight of the gum of $$Me_3Si(O\overset{H}{\underset{Me}{\overset{|}{Si}}})_{25}OSiMe_3$$

$\{CH_3O(CH_2CH_2O)_2\}_4Si$ in amount of .3% by weight Si based on the weight of the gum, 6% by weight based on the weight of the gum of dibutyl tin di-2-ethylhexoate and 2% by weight based on the weight of the gum of a crude mixture of partially hydrolyzed toluene diisocyanate containing urea linkages (sold under the name Naconate 40—40). The solution was applied to super calendered kraft paper and heated 60 seconds at 60° C. The resulting coating gave no rub-off and gave excellent release values.

(B) The above formulation was repeated except that the isocyanate employed was of the formula $$O=C=N-\langle O \rangle-CH_2-\langle O \rangle-N=C=O$$

This material was applied to paper and cured 60 seconds at 50° C., excellent results were obtained with respect to rub-off and release values.

EXAMPLE 4

Excellent release values were obtained when the following catalysts were employed in the composition of Example 1B: dibutyl tin dilaurate, lead octoate and lead neodecanoate.

EXAMPLE 5

The solvent employed in this example was xylene or a mixture of xylene and methylethylketone in the proportion shown below. The purpose of this example is to show the retarding effect of the methylethylketone on gellation in solution (bath life) after all of the ingredients have been mixed.

In each run the formulation employed was a hydroxyl endblocked polydimethylsiloxane gum in amount of 7% by weight based on the weight of the total solvent, 2% by weight based on the weight of the gum of

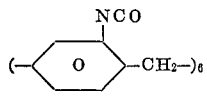

3% by weight based on the weight of the gum of

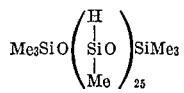

{CH₃O(CH₂CH₂O)₂}₄Si in amount of .3% by weight of Si based on the weight of the gum and 6% by weight dibutyl tin di-2-ethylhexoate based on the weight of the gum. The table below shows the bath life at room temperature of the solution relative to the percent of methylethylketone based on the total weight of the solution:

| Percent methylethylketone | Bath life at room-temperature |
|---|---|
| 0 | minutes__ 12 |
| 5 | do____ 30 |
| 10 | do____ 60 |
| 25 | hours__ 4 |
| 50 | do____ >4 |

Each solution was applied to paper and cured 60 seconds at 55° C. In each case excellent rub-off and release properties were obtained.

EXAMPLE 6

Equivalent results are obtained when

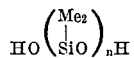

fluids of the following viscosity (cs. at 25° C.) are used in the procedure of Example 1B: 5,000, 10,000, 100,000 and 1,000,000.

EXAMPLE 7

Excellent release coatings are obtained when the following isocyanates are employed in the composition of Example 1B:

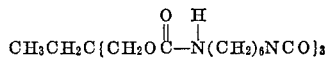

naphthalene diisocyanate-1,5
3,3′-dimethoxy-4,4′-diphenylenediisocyanate
4,4′-biphenylene diisocyanate
3,3′-dichloro-4,4′-biphenylene diisocyanate
2-nitrodiphenylene-4,4′-diisocyanate
diphenylsulfone diisocyanate
fluorene diisocyanate, and

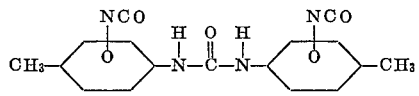

All percents are by weight.

EXAMPLE 8

A solution was prepared by dissolving 4.85% of a SiOH endblocked polydimethylsiloxane gum, .15% of

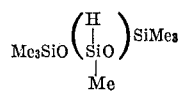

of 35 cs. viscosity at 25° C., .17% of

Si{(OCH₂CH₂)₂OMe}₄

.40% of the reaction product of 50% by weight

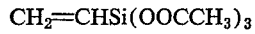

CH₂=CHSi(OOCCH₃)₃ and

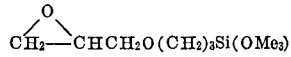

.60% by weight dibutyl tin diacetate and 93.83% of a mixture of 60% toluene and 40% heptane.

The above solution was applied to super calendered kraft paper and cured 93° C. for 30 seconds. The coating had excellent rub-off properties.

The effectiveness of the cured coating for releasing adhesives was checked by applying to the silicone film, within 15 minutes after curing, a one inch wide tape having a rubber based adhesive thereon and stripping the adhesive tape from the cured silicone at a rate of 400 inches per minute. The release was 74 to 92 g. per inch and there was no transfer of silicone to the adhesive surface as shown by excellent readhesion.

Johnson and Johnson surgical tape gave a release of 13 to 24 g. at 12 inches per minute without transfer of the siloxane to the adhesive surface.

That which is claimed is:
1. A composition of matter for use as a release coating for adhesive material consisting essentially of
   (1) a dimethylsiloxane having silicon-bonded hydroxyl groups on the end of the molecule and a viscosity of at least 2000 cs. at 25° C.,
   (2) from 1 to 10% by weight based on the weight of (1) of a methyl hydrogen polysiloxane having an average of at least 3 SiH groups per molecule,
   (3) a compound of the formula selected from the group consisting of Si{(OC₂H₄)₂OR}₄ and Si{OC₂H₄OR′}₄ in which R is an aliphatic hydrocarbon radical of from 1 to 4 inclusive carbon atoms, and R′ is aliphatic hydrocarbon radical of from 3 to 6 inclusive carbon atoms, (3) being employed in such amount that there is from 0.05 to 2% Si based on the weight of (1), and
   (4) a curing catalyst for the composition selected from the group consisting of amines, amine salts of carboxylic acids, metal salts of carboxylic acids, and mercapto salts of the formula Y₂Sn(SCH₂COOY′)₂ in which Y and Y′ are both alkyl radicals of from 1 to 18 carbon atoms.
2. The composition of claim 1 in which (4) is a carboxylic acid salt of an organo tin compound.
3. The composition of claim 1 where (4) is dibutyl tin diacetate.
4. A substrate for use in the release of adhesive materials coated with a cured composition of claim 1.
5. A substrate for use in the release of adhesive materials coated with the cured composition of claim 2.
6. A substrate for use in the release of adhesive materials coated with the cured composition of claim 3.

References Cited

UNITED STATES PATENTS

| 2,902,467 | 9/1959 | Chipman | 260—46.5 |
| 3,127,363 | 3/1964 | Nitzsche et al. | 260—18 |
| 3,398,043 | 8/1968 | Youngs | 161—190 |

FOREIGN PATENTS

| 804,199 | 11/1958 | Great Britain. |
| 844,128 | 8/1960 | Great Britain. |

DONALD E. CZAJA, Primary Examiner

M. I. MARQUIS, Assistant Examiner

U.S. Cl. X.R.

117—140, 155, 161; 260—18, 46.5, 77.5